United States Patent [19]

Van der Mey et al.

[11] 4,163,751

[45] Aug. 7, 1979

[54] THIN FILM REACTION PROCESS

[75] Inventors: John E. Van der Mey, Stirling, N.J.; Frank J. Kremers, Elbridge, N.Y.

[73] Assignee: Allied Chemical Corporation, Morris Township, Morris County, N.J.

[21] Appl. No.: 578,245

[22] Filed: May 16, 1975

Related U.S. Application Data

[62] Division of Ser. No. 387,844, Aug. 13, 1973, Pat. No. 3,902,857.

[51] Int. Cl.² ........................................... C07C 141/00
[52] U.S. Cl. ................................. 260/457; 260/458 R; 260/459 R; 260/460; 260/504 R; 260/505 K; 260/505 E; 260/505 S; 260/512 R; 260/512 C; 260/513 T; 260/458 C
[58] Field of Search ............... 260/513 T, 505 R, 457, 260/458, 459 R, 504 R, 512 R

[56] References Cited

U.S. PATENT DOCUMENTS 3,535,339  10/1970  Beyer et al. ..................... 260/513 T

FOREIGN PATENT DOCUMENTS 800029  11/1968  Canada.

Primary Examiner—A. Siegel
Attorney, Agent, or Firm—Roger H. Criss

[57] ABSTRACT

A process is disclosed which comprises the steps of introducing a stream of the organic liquid onto a plurality of rotating reacting surfaces, rotating the reacting surfaces at a velocity such that the organic liquid is continuously formed into a thin film on each reacting surface and is continuously moved as a thin film towards the periphery of each reacting surface by centrifugal force, depositing over each thin film a substantially undiluted stream of a gaseous medium, reacting the organic liquid and gaseous medium on said rotating reacting surfaces, maintaining the pressure during reaction at subatmospheric levels, moving the resulting reaction products in a radially outward direction along each reacting surface and collecting said reaction product. An apparatus for carrying out such process is also disclosed.

6 Claims, 1 Drawing Figure

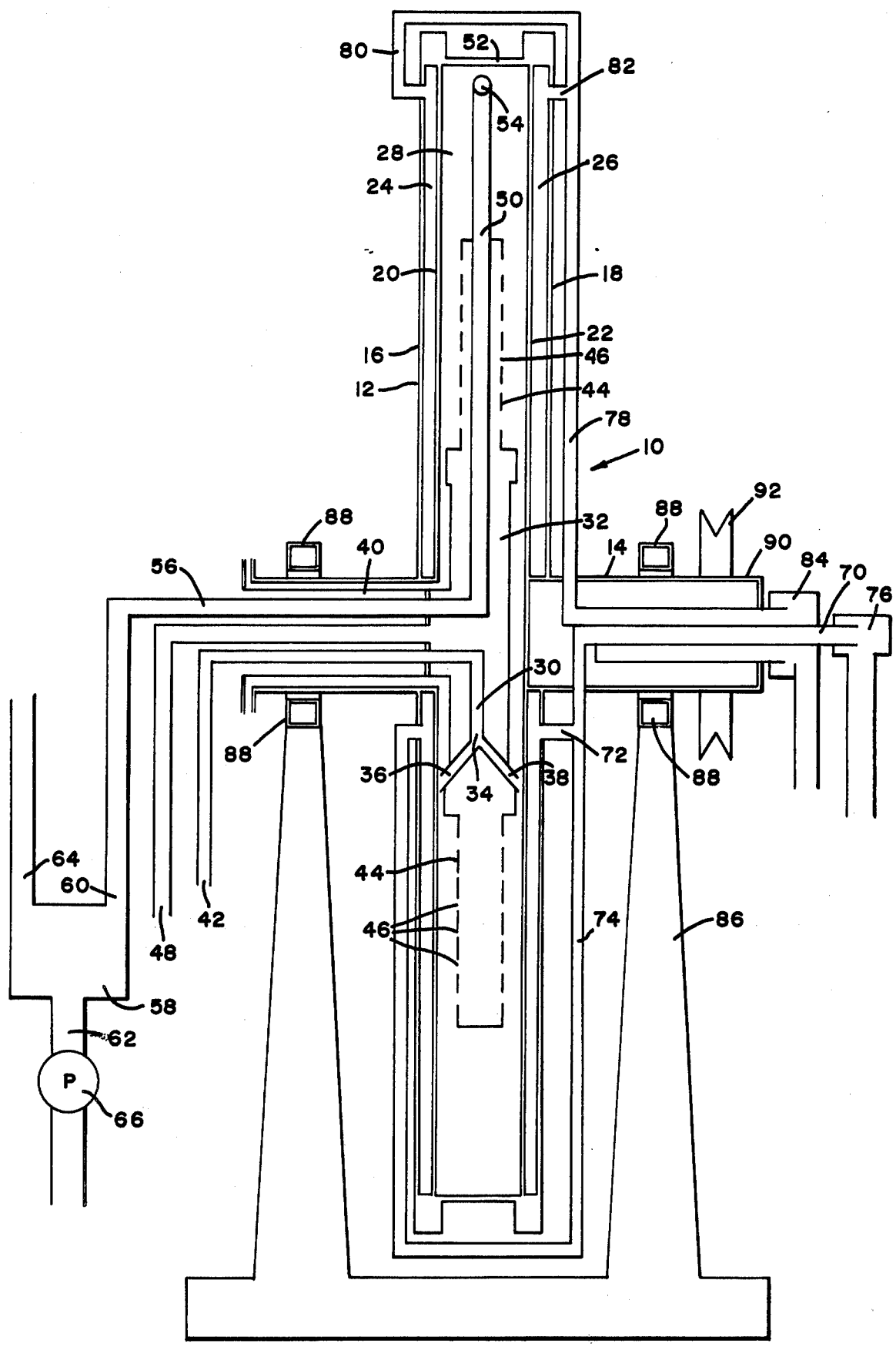

THIN FILM REACTION PROCESS

This is a division of application Ser. No. 387,844 filed Aug. 13, 1973, now U.S. Pat. No. 3,902,857.

BACKGROUND OF THE INVENTION

1. Field of the Invention

This invention relates to a process and apparatus for reacting a thin film of an organic liquid with a gaseous medium. In particular, this invention relates to a process and apparatus for reacting a sulfonatable or sulfatable organic liquid with sulfur trioxide.

2. Discussion of the Prior Art

In recent years, several processes and apparatus have been suggested for reacting thin films of sulfonatable and sulfatable organic liquids with sulfur trioxide. Perhaps the greatest impetus for such suggestions has been the increased use of such processes and apparatus for the production of synthetic detergents, such as alkyl aromatic sulfonates.

Some of the suggested processes require large quantities of inert carrier gas, such as air, introduced at high velocities to move the thin film of organic liquid along a cooled surface during reaction and to create a disturbance in the film. The use of large quantities of inert gas necessitates a large power consumption to run auxiliary equipment such as air compressors and dryers and connecting pipes. More importantly, the suggested processes utilizing large quantities of inert gases introduced at high velocities created air pollution control problems due to the amount of noxious reactant gas carried through the reactor and the quantity of organic liquid fumes which were carried along into the effluent stream. To control such problems, air scrubbers of a design requiring sizable plant space and power requirements were needed. Furthermore, many of these suggested reactors are of the vertical concentric wall type which consume much plant space.

A process and apparatus for reacting a thin film of an organic liquid with a gaseous medium which eliminates or minimizes the problems discussed above while at the same time provides reaction products which meet commercial specifications of color and percent unreacted organics is described in U.S. patent application Ser. No. 285,382, filed Aug. 30, 1972.

It would be desirable, however, to provide an improved process and apparatus for reacting a thin film of an organic liquid with a gaseous medium in terms of increased production, decreased plant space, ease in construction and improved product quality.

SUMMARY OF THE INVENTION

In accordance with the present invention an improved process and apparatus for reacting a thin film of an organic liquid with a gaseous medium is provided.

The process of this invention comprises the steps of introducing a stream of the organic liquid onto a plurality of rotating reacting surfaces, rotating the reacting surfaces at a velocity such that the organic liquid is continuously formed into a thin film on each reacting surface and is continuously moved as a thin film towards the periphery of each reacting surface by centrifugal force, depositing over each thin film a substantially undiluted stream of a gaseous medium, reacting the organic liquid and gaseous medium on said rotating reacting surfaces, maintaining the pressure during reaction at subatmospheric levels, moving the resulting reaction products in a radially outward direction along each reacting surface and collecting said reaction product.

In a preferred embodiment, the process of this invention comprises the steps of introducing a stream of the organic liquid into a reaction chamber and onto two oppositely facing reacting surfaces of a vertically spinning hollow disc near the center of the disc, spinning the disc at a velocity to create a centrifugal force which continuously forms a thin film of the liquid on each reacting surface, maintains the film and moves the film towards the perimeter of the disc, introducing over each liquid film a substantially undiluted stream of gaseous medium at a location spaced radially outward from the center of the disc, maintaining the pressure in the reaction chamber at subatmospheric levels, reacting the gaseous medium and the liquid while constantly cooling the reacting surfaces, moving the resulting reaction products in a radially outward direction and collecting the products adjacent the periphery of the disc.

The apparatus of this invention comprises a reaction chamber including a plurality of rotatable reacting surfaces, means to deposit an organic liquid on each of the reacting surfaces, means to rotate the reacting surfaces at a velocity such that the organic film is continuously formed into a thin film on each reacting surface and is continuously moved as a thin film towards the periphery of each reacting surface by centrifugal force, means to deposit a substantially undiluted stream of a gaseous medium over each thin film, means to maintain the pressure in the chamber at subatmospheric levels, and means to remove the resulting reaction products from the reaction chamber.

Preferably, the apparatus of this invention comprises a reaction chamber comprising a vertically disposed and rotatable spinning disc, first and second oppositely facing reaction surfaces internal of the spinning disc, first inlet means for introducing an organic liquid onto the first and second reaction surfaces at a location adjacent the center of the disc, second inlet means spaced radially outward from the first inlet means for introducing a gaseous medium over the first and second reacting surfaces at a location spaced radially outward from the first inlet means, driving means to rotate the disc at an angular velocity sufficient to create a centrifugal force which continuously forms a thin film of the liquid on each of the first and second reaction surfaces and moves the film in a radially outward direction toward the periphery of the disc, vacuum means to maintain the pressure in the reaction chamber at subatmospheric levels, cooling means for cooling the first and second reacting surfaces and collecting means spaced radially outward from the second inlet means to collect and remove the resulting reaction products.

Although the present invention may be used for a variety of chemical reactions between organic liquids and gaseous media, in a preferred embodiment of this invention the gaseous medium comprises sulfur trioxide and the organic liquid comprises a sulfonatable or sulfatable organic liquid.

BRIEF DESCRIPTION OF THE DRAWINGS

The FIGURE is a sectional elevation view of the apparatus of this invention which is useful in carrying out the process of this invention.

DESCRIPTION OF THE PREFERRED EMBODIMENT

As indicated above, the process and apparatus of the present invention find particular utility in the sulfonation or sulfation by sulfur trioxide of organic liquids which are sulfonatable or sulfatable. The terms "sulfonation" and "sulfation" as used herein are used interchangeably to connote reaction of sulfur trioxide with an organic compound of any of the materials known in the art to be directly sulfonatable or sulfatable by reaction with sulfur trioxide. Such compounds include saturated alcohols, phenols, olefinic compounds and monocyclic and polycyclic aromatic compounds. For example, compounds suitable for sulfation by sulfur trioxide include fatty alcohols, e.g., those containing 8 to 20 carbon atoms such as lauryl, myristyl, and cetyl alcohol; ethoxylated derivatives of the above fatty alcohols, and ethoxylated derivatives of alkyl phenols wherein the alkyl group contains from about 8 to about 16 carbon atoms. Compounds suitable for sulfonation are olefinic compounds, e.g. aliphatic olefins containing one or more double bonds, for example olefins, such as alpha olefins, containing from about 8 to about 20 carbon atoms, such as octene, decene, dodecene, tetradecene, hexadecene, etc.; aromatic hydrocarbons such as those containing a benzene, anthracene, or like structure and alkyl substituted derivatives thereof, such as toluene, ethylbenzene, dodecyl benzene, etc. The advantages of the present method of sulfonation are particularly evident in the production of alkyl aromatic sulfonic acids which when neutralized with a suitable basic reagent such as an alkali metal hydroxide, an amine or an alkanol amine form highly effective detergent compounds. Thus, the process of the present invention will be preferably applied to those alkylated aromatic compounds in which the alkyl group or groups contain a total of from 8 to 22 carbon atoms and in particular, 12 to 14 carbon atoms. In the event that the organic compound is a solid at room temperature, it may be converted to liquid form by any known procedure such as, for example, by preheating the compound.

The sulfur trioxide used as the active ingredient may be obtained from any suitable source. For example, it may be vaporized from stabilized liquid sulfur trioxide, obtained from oleum or from other conventional sources.

With reference to the drawing, there is shown, in a preferred embodiment, a spinning disc sulfonation reactor, indicated generally at 10, which includes a rotatable spinning disc 12 mounted for rotation in a generally vertical direction on shaft 14. Disc 12 includes outer walls 16, 18 of a generally circular shape and internal, oppositely facing reacting surfaces 20, 22 which are also of a generally circular shape. The disc may have a constant thickness, as shown, or may alternatively be tapered inwardly in the radial direction to define a somewhat triangular cross-section. Reacting surfaces 20, 22 are spaced from outer walls 16, 18 and the annular spaces between the respective surfaces and walls form internal cooling passageways 24, 26 as is described below.

Disc 12 is provided with a hollow central portion 28 (reacting chamber) defined by reacting surfaces 20, 22. Located within central portion 28 are first inlet means 30 for introducing the organic liquid and second inlet means 32 for introducing the gaseous medium. Liquid inlet means 30 preferably comprises a bifurcated feed head 34 which includes outlet pipes 36 and 38. Outlet pipes 36 and 38 are adapted to deliver a stream of the organic liquid to reacting surfaces 20 and 22, respectively. Feed head 34, which is stationary, is connected by suitable piping, through an opening 40 in one side of shaft 14, to an inlet opening 42. Inlet opening 42 is connected to a source of the organic liquid (not shown).

Gas inlet means 32 is also stationary with respect to rotating disc 12 and preferably also has a disc shape. An outlet section 44 is provided adjacent the radial end portion of the gas inlet means and includes a number of outlet openings 46 which face reacting surfaces 20 and 22. The size, number and spacing of the outlet openings may, of course, be varied. Outlet openings 46 are located radially outward from the center of disc 12 and from liquid inlet means 30 so that the gaseous medium may be deposited over the stream of the organic liquid. Outlet section 44 is suitably connected via piping, also through shaft 14, to an inlet opening 48. Inlet opening 48 is connected to a source of the gaseous medium (not shown).

For compactness in design, the piping for liquid inlet means 30 may extend as shown through one section of gas inlet means 32, with outlet pipes 36 and 38 extending outwards of the gas inlet means. For the same reason, inlet openings 42 and 48 may be arranged concentrically.

Also located within central portion 28 of disc 12 is a stationary collecting tube 50 which extends upwards from approximately the center of shaft 14 to a location adjacent end wall 52 of disc 12. Located at the distal end of collecting tube 50 adjacent wall 52 is a collecting head 54 which is adapted to draw off the reaction products. Collecting tube 50 is connected via outlet tubing 56 to collecting means which serves to collect the reaction products and any unreacted gas and separate the liquid and gaseous constituents.

Preferably, collecting tube 50 extends internally through another section of gas inlet means 32. Although one such collecting tube is shown, a plurality of such tubes may be utilized for collecting liquid and/or gaseous products and such tubes may be spaced at various distances from the disc end wall. Moreover, additional collecting heads 54 may be employed with a single collecting tube.

The collecting means may comprise a collecting chamber 58 which includes inlet opening 60 communicating with outlet tubing 56, an outlet opening 62 formed in the bottom of the chamber for the liquid reaction products and gas outlet opening 64 formed in the top of the chamber. The reaction product outlet opening 62 is connected via piping or tubing to a pump 66, such as a gear pump, steam vacuum pump, etc., which pumps the reaction products to a suitable reservoir (not shown). A portion of the liquid reaction product stream may be recycled into the reactor via inlet opening 42 in order to provide a thicker film of the organic liquid. The gas outlet opening 64 is connected by piping or tubing (not shown) to a suitable vacuum pump (not shown), such as a positive displacement suction pump, which serves to suck the gas constituents from the collecting chamber as an effluent stream. A portion of the gas effluent stream may also be recycled into the reactor via gas inlet opening 48.

Disc 12 is provided with cooling means which may comprise an internal cooling jacket including cooling passageways 24 and 26. Cooling pipe 70 extends partially through shaft 14 and then partially radially outwardly adjacent disc wall 18. Pipe 72 connects cooling pipe 70 to passageway 26 adjacent the radial inward portion thereof and bridging pipe 74 extends from pipe 72 and connects with passageway 24. Pipe 70 is also connected to a cooling inlet means 76 which is stationary. Adjacent the radial outward portion of walls 16 and 18, respectively, cooling outlet pipe 78 communicates with passageways 24 and 26 through pipes 80 and 82, respectively. Cooling pipe 78 is connected at its discharge end to a cooling outlet means 84 which is also stationary. A sealed rotary union is provided between pipes 70 and 78 and inlet means 76 and outlet means 84, respectively. It can be seen that cooling fluid enters inlet pipe 70, flows through pipes 72 and 74 where it enters the disc adjacent its central portion and flows radially outwardly beneath reacting surfaces 20 and 22. Spent cooling liquid exits through pipes 80 and 82 to outlet pipe 78 and thence through outlet means 84. The cooling liquid flowing internally of the spinning disc cools the reacting surface of the disc. The preferred cooling liquid is water which is preferably at room temperature but may be at a higher or lower temperature depending upon the nature of the organic liquid as well as other factors. The cooling liquid may be recycled by any conventional system and returned into cooling inlet means 76.

In an alternate embodiment, the reacting surfaces may be cooled externally by maintaining the disc under a cooling shower or bath. In such case, the internal water jacket obviously need not be employed.

Shaft 14 is mounted on support 86 and is journaled for rotation in bearings 88. One end 90 of shaft 14 has mounted thereon a drive pulley 92 which is connected by a belt to a suitable power source. The end of shaft 14 adjacent the gas and liquid openings is sealed to prevent escape of the reactants and reaction products.

In carrying out the process of this invention and wherein the gas is sulfur trioxide and the organic liquid is a sulfonatable organic liquid, the organic liquid is admitted to the reaction chamber 28 and deposited onto reacting surfaces 20 and 22 of disc 12. As spinning disc 12 rotates due to the driven rotation of shaft 14, the liquid deposited on the rotating reacting surfaces is spread out radially towards the periphery of the disc by centrifugal force. The liquid is spread into a thin film on the reacting surfaces and is then forced in a radially outward direction toward end wall 52 along the reacting surfaces.

It should be appreciated that the rotational speed of the shaft needed to provide the requisite centrifugal force to form the thin film and continuously move the same towards the periphery of the disc is dependent upon a number of factors. These factors include, for example, the size of the disc, the desired thickness of the film, the viscosity of the liquid to be deposited and the desired flow rate through the reactor. The rotational speed may be in the range of 10 to about 900 rpm and preferably between about 25 and 500 rpm. Further, it can be seen that the thickness of the film is proportional to the angular velocity of the spinning disc. It is desirable to provide a smooth, even liquid flow over the reacting surface with no bare spots in order to prevent overreaction and eliminate localized overheating which can lead to off color products. Thicker film regions are also to be avoided since they tend to produce underreacted as well as overreacted product.

The liquid as deposited will generally have a greater thickness at the central portion of the reacting surface and be thinner adjacent the periphery of the disc due to the spreading effect of centrifugal force. For example, the organic film may have an average thickness in the approximate range of 0.001 to 0.025 inch, preferably 0.002 to 0.010 inch, as determined by measuring retention time on the spinning disc for a given feed rate and disc size.

Substantially undiluted sulfur trioxide is introduced through gas inlet openings 46 and over the surface of the thin moving film of organic liquid. The term "substantially undiluted" is used herein to refer to undiluted reactant gas (e.g. 100% sulfur trioxide, which is preferred) or reactant gas which has been diluted with inert gas up to a maximum of about 2 times the volume of the inert gas. That is, the volume percent of reactant gas in the most dilute gas mixture utilized in this invention is about 33%; preferably the reactant gas comprises 80% to 100% of the mixture. This differs significantly from previous processes which utilized, for example, between about 2% and 15% reactant gas or less. The inert carrier gas in which the vaporized sulfur trioxide may be suspended is one which does not react with the sulfonatable organic compound at the specified sulfonation conditions. Examples of such gases include dry air, carbon dioxide, carbon monoxide, sulfur dioxide and nitrogen. Air is preferred if the reactant gas is diluted. However, as stated above, it is preferred to utilize undiluted sulfur trioxide (i.e. 100% $SO_3$) in order to eliminate or reduce the need for anti-pollution control devices required to cleanse carrier gases, including air dryers, compressors and scrubbers.

When introduced into reacting chamber 28, the sulfur trioxide reacts exothermally with the organic liquid to produce the desired reaction products. These reaction products, usually of a liquid nature having a high viscosity, are continuously moved radially outward towards the periphery of the spinning disc 12 by centrifugal force and thence flow into the collecting head and out of the reactor via gravity flow through collecting tube or tubes 50. Collecting head 54 acts as a scoop to remove the product. Any unreacted or product gas is also continuously moved towards the periphery of the reacting chamber and through collecting tube 50.

The flow rates of the sulfur trioxide gas and the organic liquid into the reactor are preferably at a molar ratio of about unity. The feed rates of reactants depend, of course, on the type of organic liquid utilized. For example, when the organic liquid is a fatty alcohol (such as lauryl alcohol), the flow rates preferably should be approximately equimolar, whereas when the organic liquid is an alkylated aromatic compound (such as dodecyl benzene) preferably the molar feed rate of $SO_3$ should slightly exceed that of the organic liquid (e.g., by about 2% to 4%). Moreover, when the organic liquid is an alpha olefin, preferably the molar feed rate of $SO_3$ exceeds that of the organic liquid by about 10% to 20%.

With undiluted $SO_3$ as the feed, the pressure in the interior of the reactor is maintained by the vacuum pump at subatmospheric levels and preferably below about 100 mm Hg, more preferably no greter than about 50 mm. Preferred pressures are in the range of about 1 mm to about 50 mm. It is desirable to introduce the gas into a partial vacuum because the sulfur trioxide vapors at atmospheric pressure would be too reactive with most sulfonatable organic liquids.

The cooling medium, preferably water, is circulated through the internal cooling jacket, if one is employed, at a temperature and rate such that the temperature in the reaction chamber is maintained at a desired level during the reaction. For example, when sulfonating an organic liquid with sulfur trioxide the temperature in the reaction chamber should be maintained in the range of about 0° to 150° C. during the reaction.

Contact between the sulfur trioxide and the organic liquid is made on the cooled reacting surfaces 20 and 22 and contact is maintained until the exothermic reaction is substantially complete. The surface reaction produces sulfonated organic liquid reaction products, such as alkyl aromatic sulfonates, and the reaction is substantially complete before the thin film of the reaction products reaches the periphery of the spinning disc. For this reason, it is desirable not to introduce sulfur trioxide gas at a location adjacent the center portion of the disc as overreaction may occur. Reaction products and any unreacted gas are moved along the disc surface and forced into collecting head 54 by centrifugal force where they enter collection tube 50 and are channeled out of the reaction chamber to the collecting chamber where the unreacted gas is removed via the suction pump and the sulfonated organic liquid is pumped to a reservoir.

It should be understood that when a diluent gas is utilized, the pressure in the reaction chamber may be maintained at a level above those mentioned previously for undiluted SO$_3$ feed in order to maintain the desired SO$_3$ concentration in the reactor.

As hereinabove mentioned, the method and apparatus of this invention may be employed to produce products via chemical reactions other than sulfonation, such as, for example, chlorination, bromination, fluorination, oxidation, polymerization, absorption, deodorizing, etc. For instance, organic liquids (e.g., paraffins, olefins, etc.) can be chlorinated utilizing the method and apparatus of this invention by introducing chlorine gas into the reaction chamber. In this manner, cyclopentadiene, benzene or other organic liquids can be chlorinated.

It is preferred to rotate the reacting surfaces of the reactor about a vertical or substantially vertical plane (that is, a plane which intersects the vertical plane at an angle which is no more than about 15 degrees) since the effect of gravity on the two moving films is essentially equalized. This results in the reactions on both reacting surfaces proceeding in a substantially identical manner. Moreover, a vertically spinning reactor takes up a minimum of plant floor space. However, the reacting surfaces may, if desired, by rotated in a horizontal plane or in a plane which is at any angle to the vertical plane. In that case, the liquid flow rates over each reacting surface may be varied to provide substantially equalized retention times on each surface.

Although the apparatus shown in the drawing includes two reacting surfaces, it should be understood that additional reacting surfaces may be provided, either within the same rotating disc or in adjacent discs. Similarly, although collecting tube 50 has been shown to be internally of disc 12, alternatively the collecting means may be external to the disc such as by providing openings in end wall 52 of the disc which communicates with suitable collecting tubing.

It will be apparent that the present invention provides increased production of reaction products due to the plurality of reacting surfaces as well as an apparatus which requires a minimum of plant space and is of a relatively simple design. In addition, the present invention is capable of providing a reaction product of improved quality over that obtained utilizing a spinning disc reactor having a single internal reacting surface. This is because there is a minimum of unwetted internal surface areas in the present reactor which could cause charring of the product due to condensation of reactants thereon. Furthermore, the collecting area (collecting head) is continuously flushed with the reaction liquid so that a mist or spray of the same does not accumulate thereon and reduce the quality of the product.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A process for reacting a thin film of an organic liquid with a gaseous medium comprising the steps of:
   (a) introducing said organic liquid onto two oppositely facing reacting surfaces of a spinning disc rotatable in a substantially vertical plane;
   (b) rotating said disc at a velocity such that said organic liquid is continuously formed into a thin film on each reacting surface and is continuously moved as a thin film towards the periphery of each reacting surface by centrifugal force;
   (c) depositing over each thin film a substantially undiluted stream of said gaseous medium;
   (d) reacting said organic liquid and said gaseous medium under subatmospheric pressure on said rotating reacting surfaces while cooling said surfaces;
   (e) moving the resulting reaction products in a radially outward direction along each reacting surface; and
   (f) collecting said reaction products.

2. A process as claimed in claim 1 including collecting the reactant products from each reacting surface into a single collection head and separating collected liquid reaction products from gaseous reaction products, and including recycling a portion of reaction products and depositing them together with said organic liquid on said rotating reaction surfaces.

3. A process as claimed in claim 1 wherein said gaseous medium comprises sulfur trioxide and said organic liquid comprises a sulfonatable or sulfatable organic liquid.

4. A process as claimed in claim 1 including rotating said reaction surfaces at a speed in the range of about 10 to about 900 rpm, and wherein said organic liquid and said gaseous medium are reacted at a pressure of below about 100 mm Hg.

5. A process for reacting a thin film of a sulfonatable or sulfatable liquid with gaseous sulfur trioxide comprising the steps of:
   (a) introducing said liquid onto two oppositely facing reacting surfaces of a spinning disc rotatable in a substantially vertical plane;
   (b) rotating said disc at a velocity of about 10 to 900 rpm such that said liquid is continuously formed into a thin film on each reacting surface and is continuously moved as a thin film towards the periphery of each reacting surface by centrifugal force;
   (c) depositing over each thin film a substantially undiluted stream of sulfur trioxide;

(d) reacting said liquid and said sulfur trioxide under a pressure of below about 100 mm Hg on said rotating reacting surfaces while cooling said surfaces;

(e) moving the resulting reaction products in a radially outward direction along each reacting surface; and (f) collecting said reaction products.

6. The process in accordance with claim 5 wherein said reaction is conducted at a temperature in the range of about 0° to 150° C.

* * * * *